E. B. ALLEN.
BUTTONHOLE CUTTING AND SEWING MACHINE.
APPLICATION FILED JUNE 30, 1913.

1,136,388.

Patented Apr. 20, 1915.
2 SHEETS—SHEET 1.

WITNESSES:
Leonard E. Fischer.
Géza L. Ferenc

INVENTOR
Edward B. Allen
BY
Henry J. Miller
ATTORNEY

E. B. ALLEN.
BUTTONHOLE CUTTING AND SEWING MACHINE.
APPLICATION FILED JUNE 30, 1913.

1,136,388.

Patented Apr. 20, 1915.
2 SHEETS—SHEET 2.

WITNESSES:
Leonard E. Fischer.
Géza L. Terna

INVENTOR
Edward B. Allen
BY
Henry J. Miller
ATTORNEY

UNITED STATES PATENT OFFICE.

EDWARD B. ALLEN, OF BRIDGEPORT, CONNECTICUT, ASSIGNOR TO THE SINGER MANUFACTURING COMPANY, A CORPORATION OF NEW JERSEY.

BUTTONHOLE CUTTING AND SEWING MACHINE.

1,136,388.  Specification of Letters Patent.  Patented Apr. 20, 1915.

Application filed June 30, 1913. Serial No. 776,506.

*To all whom it may concern:*

Be it known that I, EDWARD B. ALLEN, citizen of the United States, residing at Bridgeport, in the county of Fairfield and State of Connecticut, have invented certain new and useful Improvements in Buttonhole Cutting and Sewing Machines, of which the following is a specification, reference being had therein to the accompanying drawings.

This invention has for its primary object the provision of a buttonhole cutting and stitching machine in which the operation of the work-clamp closing means, the buttonhole cutting mechanism and the stitch-forming mechanism may be differently timed for production of buttonholes in which the slit is cut either before or after the stitching operation, so as to insure production of the best quality of work consistent with the character of the material.

In order to secure the best quality of work it is desirable that the stitching should succeed the cutting of the slit so that the binding stitches will wholly embrace the raw edge of the fabric, but with loosely woven or very thin fabrics it is often necessary to change the order of the cutting and stitching operations so that a sufficiently firm foundation may be presented for reception of the overseam stitches, the cutting of the slit in this case succeeding the stitching.

In the preferred embodiment of the present invention, the stitch-forming and cutting mechanisms are driven by wholly independent connections with the source of power to which they are successively coupled, one of said connections comprising a continuously running belt-wheel constituting an actuator to which may be coupled in each buttonhole producing cycle a single-rotation cutter-shaft from which the fabric cutting device receives its actuation. Controlling means are provided for inaugurating the operation of the cutting mechanism or stitch-forming mechanism immediately after the closing of the clamp, the one of said mechanisms having means whereby the other is set in motion at the completion of its period of operation.

The work-clamp is preferably provided with closing means adapted to be coupled with the continuously running actuator and provided with an operative connection with the said controlling means whereby the closing of the clamp is immediately followed by the operation of the stitch-forming and cutting mechanisms in the order for which said controlling mechanism is adjusted.

To start the machine a push-rod extending to its forward end and within convenient reach of the operator is shifted to trip the coupling device between the actuator and the clamp-closing means into operation, the latter having provision against maintenance of a period of coupling relation exceeding a complete rotation of the actuator.

Means are provided for insuring the spreading of the clamp and stretching of the fabric preparatory to the stitching operation and subsequent to the slit-cutting operation when the latter precedes the stitching, and for unspreading the work-clamp at the completion of a buttonhole producing cycle irrespective of the order in which the cutting and stitching are performed.

In the accompanying drawings.

The machine is shown constructed with the hollow rectangular base 1 whose top affords the bed-plate 2 from which rises the hollow bracket-arm standard 3 sustaining the tubular overhanging member 4.

Mounted within and longitudinally of the base is the main-shaft 5 having suitable operative connections with the reciprocating and laterally jogging needle-clamp 6 carrying the eye-pointed needle 7 coöperating in the production of overseam stitches with looper mechanism arranged below the bed-plate and connected with said shaft as shown and described in my said application.

In the machine represented in the drawings the stitch-forming mechanism is of that type in which both the jogging needle and the loop-taking means are mounted for rotation so as to perform semi-rotations in the stitching of the eyelet ends of buttonholes.

The feeding mechanism comprises an actuating cam 8 fixed upon the main-shaft and imparting vibratory movements to a lever 9 connected by a pitman 10 with the clutch-lever 11 actuating the clutch-dogs 12 embracing a depending flange of the feed-cam wheel 13 to impart to the latter step-by-step operative movements. The cam-wheel 13 has in its operative face the feed-cam groove 14 and the side-shift groove 15 and upon its periphery a series of ratchet-teeth 16 interrupted at 17 for a portion of the circumference.

The feed-cam groove 14 is entered by the roller-stud 18 depending from the lever 19 having one end fulcrumed by means of the stud-screw 20 upon the under side of the bed-plate and carrying at the opposite end a roller-stud 21 entering a transverse guideway formed in the block 22 which is secured by means of the screw 23 upon the under side of the plate 24 rigidly connected with the side-bars 25 to form a longitudinally sliding frame confined to suitable guides upon the bed-plate. Within the apertured bearing lugs 26 of the bars 25 is secured the cross-rod 27 upon which is slidingly fitted the cross slide-plate 28. This plate has a pivotal and sliding connection with the forwardly extending arm of the side-shift lever 29 mounted upon the fixed fulcrum 30 and having at its rearward end the roller-stud 31 entering the side-shift cam groove 15 whereby lateral movements are imparted to the slide-plate 28 whose longitudinal feeding movements are communicated thereto through the slide-frame 24 25.

Resting upon the slide-plate 28 and pivoted thereto by means of the stud-pins 32 are the reciprocally movable clamp-plates 33 having their adjacent edges cut out to form the clearance slot 33′ and affording upon opposite sides of said slot the laterally separable lower jaws of the work-clamp whose upper jaws are provided by the clamping feet 34 pivotally mounted upon the spring-arms 35 which are in practice fulcrumed at their rearward ends upon fulcrum-blocks 36 secured upon the clamp-plates 33, as represented more fully in my pending application Serial No. 693,778, filed April 29, 1912. Journaled in suitable bearings of each fulcrum-block 36 is a rock-shaft 37 provided with a cam portion 38 for engagement with the spring arm 35. These rock-shafts are detachably connected at their adjacent ends for movement in unison by means of the lateral arms 39 and 40 one of which carries a pin entering a fork in the other. The primary rock-shaft of the clamp nearest the operator has fixed thereon a finger-lever 41 and a tappet-arm 42 arranged in angular relation therewith, and each of said rock-shafts has rigidly secured thereon a depending finger 43 for a purpose later to be described.

Figure 2:
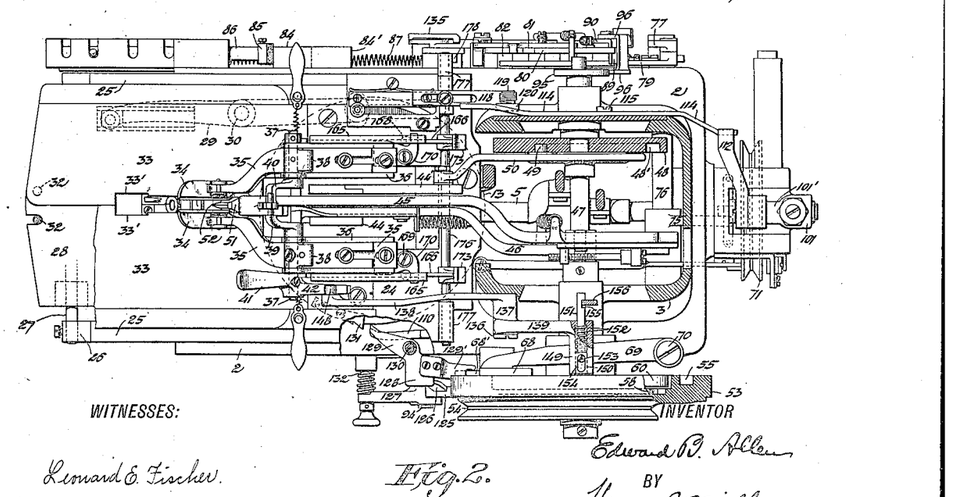

Slidingly mounted within longitudinal ways of the bed-plate is the traveling fulcrum-block 44 carrying a fulcrum-pin upon which are mounted the rocking cutter-levers 45 and 46 whose rearward ends embrace the transverse cutter-actuating shaft 47 carrying in practice cams for imparting tilting or operative movements to the cutter-levers. The cutter-shaft carries a cam-disk 48 having in one face the groove 48′ entered by the roller-stud 49 carried by the link member 50 connected with an extension 44′ of the block 44 whereby traveling movements are imparted to the cutter-levers toward and from cutting position. The upper cutter-lever 45 carries the smooth-faced cutter-block 51, and the lower cutter-lever preferably carries a series of interchangeable cutters 52 one of which is represented in part in Fig. 2.

The cutter-shaft 47 has loosely mounted thereon the continuously running belt-wheel 53 provided with the belt-receiving groove 54 and having near the outer periphery of its inner face the cam-groove 55 embracing the circular recess 56 surrounding the central boss 57 within the periphery of which is disposed the annular projection 58 formed with circularly spaced notches 59 to afford a series of coupling teeth. Fixed upon the cutter-shaft is the disk 60 formed with the radial guideway 61 in which is fitted the slide-block 62 having the lateral coupling tooth 63 normally pressed outwardly for engagement with the teeth 58 of the loose belt-wheel or actuator by means of the spring 64 secured to the outer face of the disk 60 by the fastening screw 65.

Figures 4, 5, 6, 7, 8, 9:
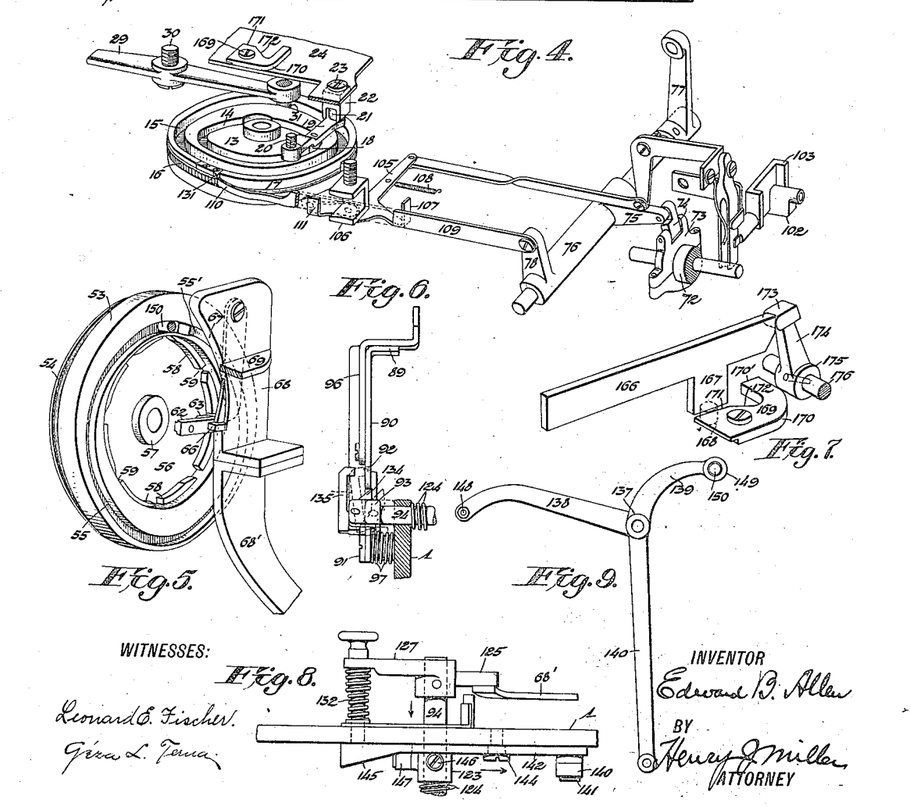
Fig. 4 is a perspective view of the feeding mechanism and a portion of its controlling means.
Fig. 5 is a perspective view representing the coupling means whereby the cutting mechanism is operatively connected with its actuator.
Fig. 6 is a detail elevation representing a portion of the feed-wheel actuating means.
Fig. 7 is a perspective view of the clamp-spreading means.
Fig. 8 is a plan view of a portion of the controlling means.
Fig. 9 is an elevation of the plural-armed rocking member serving to close the clamp and to operate the controlling means.

The coupling tooth 63 is normally maintained retracted from operative relation with the actuator 53 by engagement with a lug 66 upon the slide-block 62 of the cam-shaped edge 67 of a flange 68 of the lever 69 fulcrumed upon the stud-screw 70. The temporary retraction of the lever 69 for release of the lug 66 permits the coupling of the disk 60 with the belt-wheel to produce a rotation of the cutter-shaft which is arrested at the completion thereof by reëngagement of the lug 66 with the cam-edge of the flange 68, as represented in Fig. 5.

The rear end of the main-shaft 5 has mounted thereon the continuously running loose belt-wheel 71 whose hub 72 is provided with an eccentric embraced by the strap 73 connected by the link 74 with a lateral arm 75 of a rock-shaft 76 provided with the upwardly extending crank-arms 77 and 78. To the crank-arm 77 is pivotally attached one end of the pawl-lever 79 which, with the primary and auxiliary holding pawls 80 and 81 acting upon the rack 82, serves to impart endwise step-by-step operative movements to the push-bar 83 carrying the thrust block 84 which is normally maintained in engagement with the head 85 of the adjustable stop-bar 86 by means of the spring 87.

When the machine is in starting position, the work-holder is disposed in cutting position at the extreme rearward end of its traverse and out of register with the stitch-forming mechanism, and preparatory to a stitching operation the feed-wheel receives a partial rotation to bring the work-holder into register with the stitch-forming mechanism. This is effected through the engagement of the peripheral ratchet-teeth 16 by a spring-pressed pawl 88 (Fig. 3) carried by the push-bar 83, the extent of such initial movement being determined by the position of adjustment of the bar 83 which is in turn determined by the position of the stop-member 86.

The pawls 79, 80 and 81 are normally held lifted above the rack 82 by engagement of the hook 80' of the primary holding pawl with a lateral lip 89 at the upper end of the upwardly extending arm 90 of an elbow-lever fulcrumed at 91 and provided with the lateral arm 92 adapted to rest upon the face of the forked block 93 of the starting bar 94 journaled in the machine base. The cutter-shaft carries upon its rearward end the snail-shaped cam 95 which, near the completion of a rotation, acts upon a yielding extension 96 of the arm 90 to effect the release of the holding pawl and assumption of operative relation between the said pawls and the rack 82 to impart an operative movement to the push-bar 83. The pawl mechanism is so constructed that at the completion of an operative movement of the push-bar the pawls are automatically lifted and the lever-arm 90 caused by the action of the spring 97 to assume operative relation with the hooked extremity 80' of the holding pawl 80, the latter serving to maintain the other pawls retracted from engagement with the rack 82.

The depending rearward extension 83' of the push-bar carries the tripping stud 98 adapted for engagement with the depending arm 99 of the rock-shaft 100 sustaining the tilting stop-lever 101, and the tilting of this stop-lever disengages the tooth 102 upon the spring-pressed slide-block 103 carried by said lever from the clutch member 104 fixed upon the main-shaft 5 to effect the coupling of the belt-wheel 71 with the main-shaft and the consequent operation of the stitch-forming mechanism and the normal actuation of the feed-cam wheel in imparting the requisite traveling movements of the work-clamp relatively to the stitch-forming mechanism.

The slide-block 103 has, as represented in Fig. 4, a detachable connection with the plural-armed lever 105 pivotally mounted upon the hanger 106 sustained by the bed-plate and having a lateral arm formed with a bearing lip 107 normally pressed by means of the spring 108 against the inner face of the endwise reciprocating pawl-bar 109 connected at its rearward end with the rock-shaft arm 78 and having the toothed forward extremity 110 adapted for engagement with the peripheral teeth 16 of the feed-cam wheel. When the slide-block 103 descends in the action of the stop-motion to arrest the stitch-forming mechanism, a bearing lip 111 of another arm of the rock-lever 105 thrusts the pawl-bar 109 into operative relation with the periphery of the feed-cam wheel, whereby upon the arrest of the operation of the clutch-dogs 12 the movement of the feed-cam wheel is continued until the pawl-bar comes into register with the smooth section 17 of the cam-wheel, when the latter ceases its movement at the end of a complete rotation from initial starting position wherein the work-holder again assumes initial cutting position.

The stop-lever 101 has at its upper end an offset portion 101' provided with the lateral arm 112 adapted for engagement by the hooked extremity 113 of the detent lever 114 fulcrumed at 115 and provided in its opposite end with the inclined nose 116. Secured upon the traveling plate 24 is a block 117 upon which is adjustably secured the bar 118 carrying the fulcrum-stud 119 upon which is mounted the tripping dog 120 yieldingly maintained in normal upright position by means of the spring 121 with a stop-shoulder thereon resting upon the bar 118. In the longitudinal travel of the slide-frame 24 25 the dog 120 is thrust aside by engagement with the abrupt shoulder upon the lower edge of the detent-lever 114; but upon the return movement of the slide frame, the engagement of the inclined upper end of the now rigid tripping dog 120 with the extremity 116 of the detent lever causes the tilting of the latter and release of the stop-lever 101, which, under the action of its spring 122, moves to stopping position for the arrest of the main-shaft and the parts driven thereby.

As represented more particularly in Figs. 6 and 8, the starting bar 94 has fixed thereon the thrust collar 123 between which and an inner wall of the base 1 is interposed the spring 124 whereby such bar is maintained in normal retracted position. Fixed upon the forward end of this bar is a tripping member formed with the angularly arranged arms 125, 126 and 127. The arm 125 is adapted for engagement with a depending extension 68' of the flange 68 of lever 69, while the rounded upper extremity of the arm 126 is adapted to engage the under face of a lateral extension 128 of the trip lever 129 fulcrumed upon the stud 130 for lifting it out of operative relation with the tripping stud 131 carried by the feed-wheel. The forked rearwardly extending arm or extension 129' of this trip lever embraces the extension 68' of the flange 68. The arm 127 carries the spring-pressed pin 132 adapted, when the tripping member is in one of two extreme positions, to enter one of two apertures 133 of the base 1 to maintain the bar 94 in the required position of axial adjustment.

Figure 1:
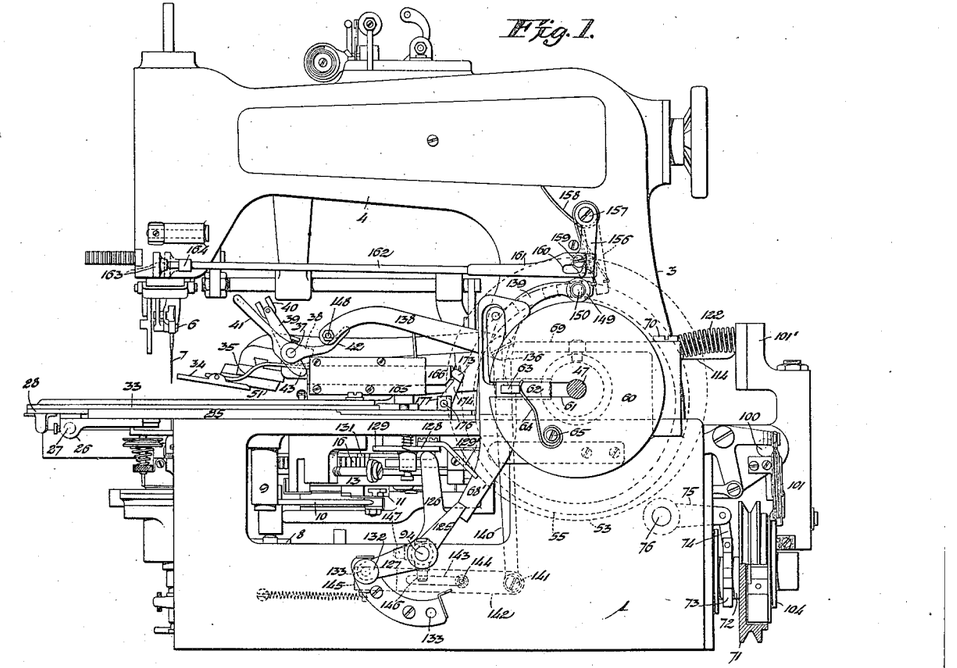
Figure 1 is a front side elevation of a buttonhole sewing machine of the type represented in my pending application Serial No. 752,257, filed March 6, 1913, and embodying the present invention, and Fig. 2 a plan of the same with the bracket-arm removed.

In the position of the parts represented in Fig. 1, the endwise shifting of the starting bar, by an initial shifting of the throw-out lever 69, produces a rotation of the cutter-shaft to actuate the cutting mechanism followed by the travel of the work-holder to stitching position and the stitching of the buttonhole which is succeeded by the return of the work-holder to initial cutting position. A second actuation of the cutter is prevented by the displacement of the trip-lever 129 from the path of movement of the tripping stud 131.

When the starting bar 94 is given a quarter turn by shifting the arm 127 into opposite extreme position, the arms 125 and 126 assume positions out of operative relation with the parts 68' and 128, and the actuation of the starting bar then produces an operative movement of the rocking cam-plate 134 mounted in the block 93, from dotted line position to full line position (Fig. 6) whereby the lateral arm 92 of the elbow lever 90 92 is thrust upwardly and the holding pawl 80 disengaged from its detaining means, thus permitting the operation of the ratchet-and-pawl mechanism whereby the push-bar 83 is operated to impart through the feed-cam the initial traveling movement of the work-clamp. In this adjustment of the starting bar, the work-clamp is first moved from cutting into stitching position, the stitching performed, the work-holder returned to cutting position, and the cutting mechanism finally tripped into action by engagement of the tripping stud 131 with the trip-lever 129. As the lever-arm 92 is locked against a second actuation through the action of the cam 95 by means of the latch arm 135 of the cam-block 134, the machine completes a buttonhole producing cycle by the mere thrusting aside of the yielding section 96 of the lever-arm 90 by the cam 95.

Mounted upon a fulcrum-stud 136 tapped into the front face of the standard 3 is the hub 137 of a plural-armed rocking member having the forwardly extending arm 138, the rearwardly and upwardly extending arm 139 and the depending arm 140. The depending arm 140 is connected by means of the stud-screw 141 with the rearward end of a slide-bar 142 formed with a longitudinal slot 143 to receive the guiding stud-screw 144 by means of which it is slidingly secured upon the inner face of the front wall of the base 1. The slide-bar 142 is formed at its forward end with the inwardly inclined cam projection 145 movable beneath the starting bar 94 and adapted for engagement with either of two roller-studs 146 and 147 secured in angular relation upon the thrust collar 123. The endwise movement of the slide-bar 142 causes the forcible engagement of the cam projection 145 with either of the studs 146 and 147 presented for engagement with the same, accordingly with the circular adjustment of the bar 94, to shift the latter endwise in opposition to its spring 124 for effecting the successive coupling of the stitch-forming and cutting mechanisms with their respective continuously running actuators as previously described.

The arm 138 carries a lateral stud 148 adapted for engagement with the curved upper edge of the tappet arm 42 upon the work-clamp rock-shaft 37, which elements constitute a clamp-closing train of mechanism.

The arm 139 of the rocking member is formed with a laterally extending boss 149 having a socket in which is fitted the plunger pin 150 adapted to enter the cam-groove 55 of the belt-wheel or actuator 53 of which it constitutes a follower. This plunger-pin has a reduced portion 151 extending backwardly through the bottom of the socket and surrounded by a spring 152 adapted to press said pin outwardly toward the belt-wheel 53.

The plunger-pin is prevented against turning and is limited in its endwise movements by means of a stud-screw 153 tapped therein and working in a slot 154 in the boss 149. The plunger-pin is formed near the end of its reduced portion with a lateral notch 155 which is entered by a latch-lever 156 depending from the stud-screw 157 and pressed normally into engagement with the plunger-pin by means of the spring 158.

The latch-lever 156 carries a screw-stud 159 which normally enters the lateral member of an L-shaped slot 160 in the head 161 of the push-rod 162 having upon its forward end the button 163 and sustained adjacent the same by the bearing boss 164 secured to the head of the bracket-arm. By pressure upon the button 163, the push-rod causes the disengagement of the latch-lever 156 from the plunger-pin which is thrust outwardly under the action of its spring 152 for entrance into the actuator cam-groove 55. In the succeeding rotation of the actuator, the plunger-pin follows the contour of the cam-groove and thereby imparts an operative movement to the rocking member 138 139 140 at the completion of which the plunger-pin is forced backwardly by the inclined bottom 55' of the cam-groove, thus permitting the latch-lever to resume its operative relation with the plunger-pin under the action of the spring 158.

To insure against the detention of the latch-lever 156 in retracted position, as represented in dotted lines in Fig. 1, the member 161 of the push-rod is arranged so as to be lifted by engagement with the arm 139, thereby bringing the longitudinal portion of the slot 160 into register with the stud 159 to afford clearance whereby the latch-lever is permitted to return freely to latching position, in case the push-rod should not be released with sufficient promptness by the operator to prevent a second actuation of the rocking member in the next succeeding rotation of the actuator.

The parts above described are so arranged and proportioned that the arm 138, just before completion of its downward movement, acts upon the tappet-arm 42 to close the clamp, immediately after which the movement of the slide-bar with the depending arm 140 produces an actuation of the starting bar 94 to set the cutting and stitching mechanisms successively in operation.

Each of the work-clamp fulcrum-blocks 36 is provided with a longitudinal slideway 165 in which is fitted a slide-bar 166 formed with a depending lug 167 carrying a roller-stud 168. Secured upon the slide-frame plate 24 by means of the screws 169 are the cam-plates 170 each having its operative edge formed in straight and inclined portions 171 and 172 adapted for successive engagement by the roller-stud 168. The forward end of each slide-bar 166 is adapted for engagement by the rounded extremity of one of the clamp rock-shaft arms 43, while its rearward extremity is similarly adapted for engagement by the head 173 of a crank-arm 174 whose hub 175 is secured upon the transverse rock-shaft 176 mounted in bearing brackets 177 sustained by the bed-plate 2 and provided at the rearward end with the depending tappet-arm 178.

Figure 3:
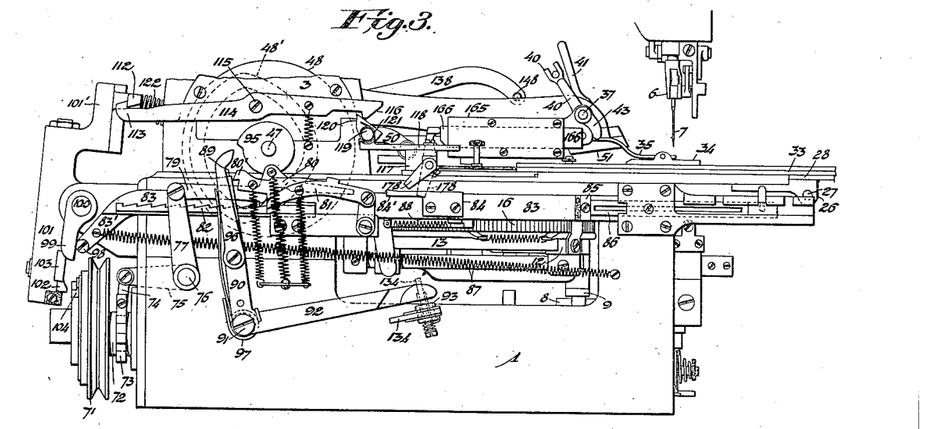
Fig. 3 is a rear side elevation of the base portion of the machine with the parts sustained thereby.

The tappet-arm 178 normally assumes the dotted line position represented in Fig. 3, but during the shifting of the work-clamp from cutting to stitching position under the action of the push-bar 83, this tappet-arm is engaged by the rearward extremity of the extension 84' of the thrust-block 84 and thrust aside into its full line position of said figure, thereby advancing the crank-arms 174 and thrusting the slide-bar 166 forwardly to cause the roller-studs 168 to ride up the inclined cam portions 172 and onto the straight portions 171 of the cam-plates 170 by means of which the slide-bars are thrust apart and the laterally separable pairs of clamping members composing the work-holder are thus spread so as to stretch the material preparatory to the stitching operation. The slide-bars 166 are permitted to remain in their advance positions during the travel of the work-clamp in the stitching operation and their return to initial cutting position, but are forced backwardly when the finger-lever 41 is manually shifted to open the clamp, thereby pressing the tappet-arms 43 into engagement with the forward extremities of the slide-bars 166 and forcing them backwardly for disengagement of the roller-studs 168 with the operative portions 171 and 172 of the cam-plates 170. The cam-plates 170 are shown provided with the laterally projecting portions 170' serving as stops for engagement with the roller-studs 168 so as to arrest the travel of the slide-bars 166 in performing their unspreading movements.

From the foregoing description it will be observed that in the present embodiment of this improvement the coupling means for operatively connecting the cutter-shaft 47 with the actuating belt-wheel 53 comprises the driving clutch element 58, the driven clutch element 62 and the throw-out lever 69 with its cam-edged flange 68; and that the controlling means for inaugurating the successive operation of the stitch-forming and cutting mechanisms comprises the circularly adjustable starting bar 94 carrying the tripping members 125 126 127 and 134 135, with the feed-wheel carrying the tripping stud 131, the feed-wheel actuating means and the tripping cam 95 upon the cutter-shaft.

It is evident that the several groups of mechanism herein shown and described are susceptible of considerable modification in construction and arrangement of parts, and that they may be otherwise associated and certain of them omitted without departure from the scope of the present invention, which has relation more particularly to certain general combinations of elements whereby machines of the class described are adapted for a much wider range of use than has been practicable heretofore.

Having thus set forth the nature of the invention, what I claim herein is:—

1. In a buttonhole sewing machine, in combination, buttonhole cutting and stitch-forming mechanisms, a work-clamp, clamp-closing means, and means dependent in its operation upon the clamp-closing means and the cutting and stitch-forming mechanisms for producing in different orders the clamp-closing, cutting and stitching operations.

2. In a buttonhole sewing machine, in combination, buttonhole cutting and stitch-forming mechanisms, a work-clamp, clamp-closing means, and interdependent means for producing in different orders the clamp-closing, cutting and stitching operations with provision for insuring the invariable closing of the clamp prior to the cutting and stitching operations.

3. In a buttonhole sewing machine, in combination, buttonhole cutting and stitch-forming mechanisms, a work-clamp, clamp-closing means, and controlling means operatively connected with the clamp-closing means and adapted for adjustment to cause the successive operation of the stitch-forming and cutting mechanisms in different orders subsequently to the initial closing of the clamp.

4. In a buttonhole sewing machine, in combination, buttonhole cutting and stitch-forming mechanisms, a work-clamp, controlling means including an adjustable element adapted to be set prior to the performance of a cycle of operation of the machine to set in operation the cutting mechanism either before or after the action of the stitch-forming mechanism, and a connection between the work-clamp and said controlling mechanism whereby the closing of the clamp is succeeded by the cutting and stitching operations in either order.

5. In a buttonhole sewing machine, in combination, buttonhole cutting and stitch-forming mechanisms, a work-clamp, automatically acting clamp-closing means, and controlling means operatively connected with the clamp-closing means and adapted for adjustment to cause the successive operation of the stitch-forming and cutting mechanisms in different orders subsequently to the initial closing of the clamp.

6. In a buttonhole sewing machine, in combination, buttonhole cutting and stitch-forming mechanisms, a continuously running actuator, controlling means for successively setting in action the cutting and stitch-forming mechanisms with means whereby the order of operation of said mechanisms may be reversed, and means for operatively connecting the controlling means with said actuator.

7. In a buttonhole sewing machine, in combination, buttonhole cutting and stitch-forming mechanisms, a continuously rotating actuator, controlling means for successively setting in action the cutting and stitch-forming mechanisms with means whereby the order of operation of said mechanisms may be reversed, means for operatively connecting the controlling means with said actuator, and means for insuring the interruption of said connection prior to completion of a rotation of said actuator.

8. In a buttonhole sewing machine, in combination, buttonhole cutting and stitch-forming mechanisms, a work-clamp, clamp-closing means, clamp-spreading means, and interdependent means for producing in different orders the clamp-closing, clamp-spreading, buttonhole cutting and stitching operations.

9. In a buttonhole sewing machine, in combination, buttonhole cutting and stitch-forming mechanisms, a work-clamp, clamp-closing means, clamp-spreading means, and interdependent means for producing in different orders the clamp-closing, clamp-spreading, buttonhole cutting and stitching operations with provision for insuring the invariable closing of the clamp prior to the cutting and stitching operations and the spreading of the clamp prior to the stitching operation.

10. In a buttonhole sewing machine, in combination, buttonhole cutting and stitch-forming mechanisms, a work-clamp, clamp-closing means, clamp-spreading means, interdependent means for producing in different orders the clamp-closing, clamp-spreading, buttonhole cutting and stitching operations with provision for insuring the invariable closing of the clamp prior to the cutting and stitching operations and the spreading of the clamp prior to the stitching operation, and means for effecting the unspreading of the clamp in the opening of the latter to release the work.

11. In a buttonhole sewing machine, in combination, buttonhole cutting mechanism, a work-clamp, clamp-closing means, an actuator, coupling means for establishing operative connection between said clamp-closing means and actuator and comprising means for preventing repeated actuation of the clamp-closing means during such connection, and coupling means for establishing operative connection between said cutting mechanism and actuator independently of the first-named coupling means and comprising means for preventing repeated actuation of said cutting mechanism.

12. In a buttonhole sewing machine, in combination, buttonhole cutting mechanism, a work-clamp, clamp-closing means, an actuator, coupling means for establishing operative connection between said clamp-closing means and actuator and comprising means for preventing repeated actuation of the clamp-closing means during a buttonhole producing cycle, coupling means for establishing operative connection between said cutting mechanism and actuator independently of the first-named coupling means and comprising means for preventing repeated actuation of said cutting mechanism, and an operative connection between said clamp-closing means and the coupling means for said cutting mechanism.

13. In a buttonhole sewing machine, in combination, buttonhole cutting mechanism, a work-clamp, clamp-closing means, a continuously running actuator, means adapted to be set at will for determining the timing of operation of the cutting mechanism subsequently to the closing of the work-clamp, and means for coupling the clamp-closing and cutter timing means with said actuator.

14. In a buttonhole sewing machine, in combination, buttonhole cutting mechanism, an actuator, coupling means for operatively connecting the cutting mechanism with the actuator, controlling means for determining the time of operation of said coupling means, a work-clamp, and clamp-closing means operatively connected with said controlling means.

15. In a buttonhole sewing machine, in combination, buttonhole cutting mechanism, an actuator, coupling means for operatively connecting the cutting mechanism with the actuator, controlling means for determining the time of operation of said coupling means, a work-clamp, clamp-closing means operatively connected with said controlling means, and coupling means for operatively connecting the clamp-closing means with said actuator.

16. In a buttonhole sewing machine, in combination, buttonhole cutting mechanism, an actuator, coupling means for operatively connecting the cutting mechanism with the actuator, controlling means for determining at will the time of operation of said coupling means, a work-clamp, clamp-closing means comprising a rocking member having independent connections with said controlling means and said clamp, and means for operatively connecting said rocking member with said actuator.

17. In a buttonhole sewing machine, in combination, buttonhole cutting mechanism, an actuator, coupling means for operatively connecting the cutting mechanism with said actuator, controlling means comprising independent tripping elements for actuating said coupling means, and means adapted for operative connection with said actuator for actuating said controlling means.

18. In a buttonhole sewing machine, in combination, buttonhole cutting and stitch-forming mechanisms, continuously running actuators therefor, coupling means for operatively connecting said mechanisms with their respective actuators, controlling means comprising an adjustable element adapted to be set to produce an initial actuation of either of said coupling means at will, and means for actuating said controlling means.

19. In a buttonhole sewing machine, in combination, buttonhole cutting and stitch-forming mechanisms, continuously running actuators therefor, coupling means for operatively connecting said mechanisms with their respective actuators, controlling means comprising an adjustable element adapted to be set to produce an initial actuation of either of said coupling means at will, and means adapted for operative connection with one of said actuators for imparting an operative movement to said controlling means.

20. In a buttonhole sewing machine, in combination, buttonhole cutting and stitch-forming mechanisms, continuously running actuators therefor, coupling means for operatively connecting said mechanisms with their respective actuators, controlling means comprising an adjustable element adapted to be set to produce an initial actuation of either of said coupling means at will, means adapted for operative connection with one of said actuators for imparting an operative movement to said controlling means, and means for preventing a second actuation of said controlling means during a buttonhole producing cycle.

21. In a buttonhole sewing machine, in combination, a work-clamp, a continuously moving cam, a clamp-closing member in operative relation with said work-clamp and normally disconnected from said cam, means for establishing a direct connection between said clamp-closing member and the cam, and means for insuring the interruption of said connection to prevent the repeated actuation of said member during a buttonhole producing cycle.

22. In a buttonhole sewing machine, in combination, a work-clamp, a clamp-closing member disposed in operative relation with said work-clamp and carrying a cam-follower, a cam provided with means for engagement with said follower to actuate the clamp-closing member and with follower ejecting means, and means for establishing operative relation of said follower with the cam.

23. In a buttonhole sewing machine, in combination, a work-clamp, a clamp-closing member disposed in operative relation with said work-clamp and carrying a spring-pressed cam-follower, a cam provided with means for engaging said follower to actuate the clamp-closing member and with follower ejecting means, a latch for maintaining the follower normally retracted from said cam, and latch-releasing means.

24. In a buttonhole sewing machine, in combination, a work-clamp, a clamp-closing member disposed in operative relation with said work-clamp and carrying a spring-pressed cam-follower, a cam provided with means for engaging said follower to actuate the clamp-closing member and with follower ejecting means, a latch for maintaining the follower normally retracted from said cam, and latch-releasing means normally in operative relation with said latch but adapted for disengagement therefrom by engagement with the clamp-closing member.

25. In a buttonhole sewing machine, in combination, stitch-forming mechanism, a traveling work-clamp, means acting in each buttonhole producing cycle for shifting the work-clamp preparatory to a stitching operation, clamp-spreading means sustained by the work-clamp, and actuating means connected with the clamp-shifting means and adapted to operate said spreading means to spread the clamp during its shifting movement.

26. In a buttonhole sewing machine, in combination, stitch-forming mechanism, a traveling work-clamp, means for shifting the work-clamp preparatory to a stitching operation and having means for adjustment of the extent of the shifting movement, and means comprising an element having a uniform range of traverse for different lengths of buttonhole and actuated by said shifting means for spreading said clamp.

27. In a buttonhole sewing machine, in combination, stitch-forming mechanism, cutting mechanism, tripping means controlled by said cutting mechanism for setting the stitch-forming mechanism in operation, a traveling work-clamp comprising laterally separable pairs of clamping members, a pair of rigidly connected cam elements traveling with said work-clamp, followers connected with said pairs of clamping members and adapted for engagement with said cam elements, and means controlled by said tripping means independently of the cutting mechanism for shifting said followers relatively to said cam elements.

28. In a buttonhole sewing machine, in combination, buttonhole cutting and stitch-forming mechanisms, an actuator for the stitch-forming mechanism, means for actuating the cutting mechanism independently of said actuator, a work-clamp comprising laterally separable pairs of clamping members, feeding means for producing between said work-clamp and the stitch-forming mechanism traveling movements for spacing the stitches, and means independent of said feeding means and of the actuating means for the cutting mechanism for separating said pairs of clamping members preparatory to a stitch-forming operation.

29. In a buttonhole sewing machine, in combination, buttonhole cutting and stitch-forming mechanisms, an actuator for the stitch-forming mechanism, means for actuating the cutting mechanism independently of said actuator, a work-clamp comprising laterally separable pairs of clamping members, feeding means for producing between said work-clamp and the stitch-forming mechanism traveling movements for spacing the stitches, tripping means controlled by the cutting mechanism for establishing driving relation between said actuator and the stitch-forming mechanism, and means connected with and actuated by said tripping means for separating said pairs of clamping members preparatory to a stitch-forming operation.

30. In a buttonhole sewing machine, in combination, stitch-forming mechanism, a traveling work-clamp comprising laterally separable pairs of clamping members, a pair of rigidly connected cam elements traveling with said work-clamp, followers connected with said pairs of clamping members and adapted for engagement with said cam elements, means for shifting said work-clamp preparatory to a stitching operation, and means operatively connected with the clamp-shifting means for shifting said cam followers in the same direction with and during but differentially of said movements of the work-clamp.

31. In a buttonhole sewing machine, in combination, stitch-forming mechanism, a traveling work-clamp comprising laterally separable pairs of clamping members, a pair of rigidly connected cam elements traveling with said work-clamp, followers connected with said pairs of clamping members and adapted for engagement with said cam elements, a rock-shaft mounted in fixed bearings, actuating means for said rock-shaft, and connections between said rock-shaft and said followers whereby the latter are caused to engage said cam elements for spreading the work-clamp.

32. In a buttonhole sewing machine, in combination, stitch-forming mechanism, a traveling slide-plate, edgewise separable clamp-plates mounted thereon and each provided with a coöperating clamping member, cams fixed upon said slide-plate, slide-bars sustained by said clamp-plates each in operative relation with its respective cam, and means for moving said slide-bars relatively to said slide-plate to effect the spreading of said clamp-plates.

33. In a buttonhole sewing machine, in combination, stitch-forming mechanism, a traveling slide-plate, edgewise separable clamp-plates mounted thereon and each provided with a coöperating clamping member, cams fixed upon said slide-plate, slide-bars sustained by said clamp-plates each in operative relation with its respective cam, means for moving said slide-bars relatively to said slide-plate to effect the spreading of said clamp-plates, and means sustained by said clamp-plates for retracting said slide-bars.

34. In a buttonhole sewing machine, in combination, buttonhole cutting and stitch forming mechanisms, a work-clamp, clamp-closing means, and interdependent means adapted for operative connection with and deriving operative movements solely from moving parts of the machine for producing in different orders the clamp-closing, cutting and stitching operations.

35. In a buttonhole sewing machine, in combination, buttonhole cutting and stitch-forming mechanisms, a work-clamp, clamp-closing means, and interdependent means including an adjustable element provided with means for setting and locking it in different controlling positions of adjustment preparatory to a buttonhole producing cycle, whereby the clamp-closing, cutting and stitching operations may be effected in different orders.

In testimony whereof, I have signed my name to this specification, in the presence of two subscribing witnesses.

EDWARD B. ALLEN.

Witnesses:
STANLEY N. SMITH,
JOHN J. REILLY.